Dec. 2, 1969          E. FINKIN          3,481,439

INTERNALLY COOLED MOTION CONTROL SYSTEM

Filed Jan. 17, 1968          2 Sheets-Sheet 1

INVENTOR.
EUGENE FINKIN
BY
*Nilsson + Robbins*
ATTORNEYS

Dec. 2, 1969          E. FINKIN          3,481,439
INTERNALLY COOLED MOTION CONTROL SYSTEM
Filed Jan. 17, 1968                    2 Sheets-Sheet 2
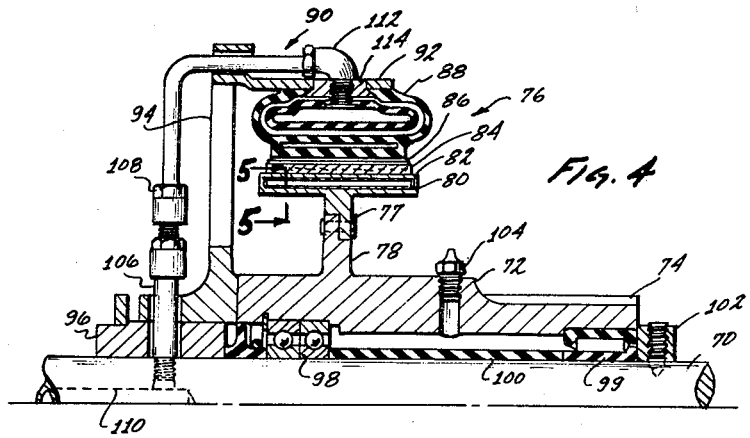
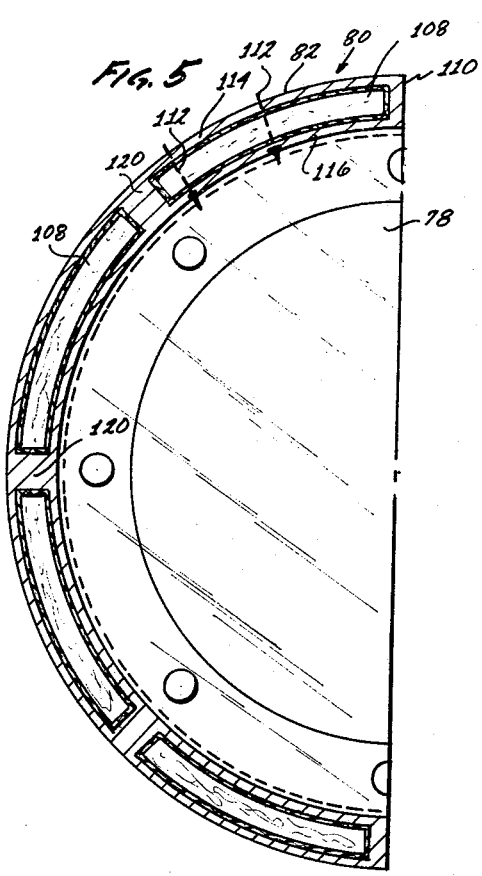
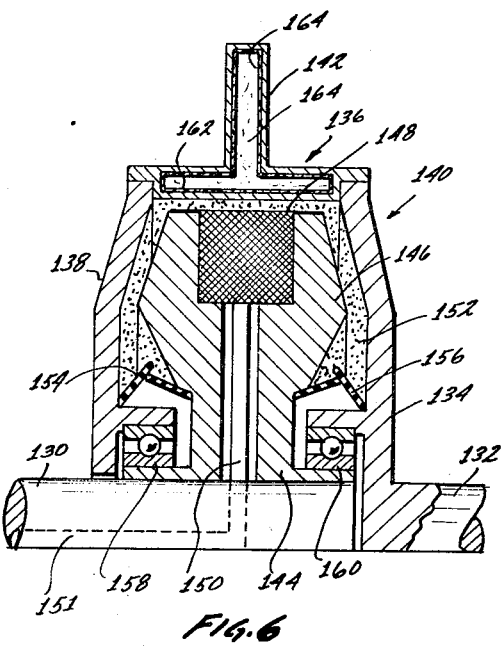
INVENTOR.
EUGENE FINKIN
BY
ATTORNEYS

United States Patent Office 3,481,439
Patented Dec. 2, 1969

3,481,439
INTERNALLY COOLED MOTION CONTROL SYSTEM
Eugene Finkin, Apt. 106, 817 2nd St.,
Santa Monica, Calif. 90403
Filed Jan. 17, 1968, Ser. No. 698,554
Int. Cl. F16d *13/72, 65/78;* F28f *5/00*
U.S. Cl. 192—113
10 Claims

ABSTRACT OF THE DISCLOSURE

Motion control structures, e.g. clutches and brakes, are disclosed which intimately corporate evaporation-condensation heat transfer apparatus. Both disk and drum embodiments are presented, with electrical and pneumatic actuation disclosed as exemplary. To illustratively represent the frictional force means, both viscous and Coulomb friction means are disclosed.

The inside of the heat-transfer member is segmented into cavities that are lined with a capillary flow medium containing the working fluid, which establishes heat-transfer flow paths within the heat-transfer member by repeated evaporation and condensation.

BACKGROUND AND SUMMARY OF THE INVENTION

Brakes and clutches are examples of motion-control structures which have the specific functions of restricting motion and transferring motion, respectively. In general, the operation of these structures is somewhat dependent upon frictional forces, in one form or another. As a result, conventionally, signifiicant quantities of heat are developed in the operation of motion-control structures, which must be dissipated to avoid high temperatures and resultant structural damage.

The problem of heat dissipation has severely restricted designs and applications for motion-control structures of the past. Heat dissipation has been one of the major design considerations, determinative of the final control structure for a particular application. In this regard, a motion-control structure must be sufficiently large to dissipate the heat that is generated during its anticipated periods of operation. As a result, a conventional motion-control structure may be required to be large, merely to accommodate developed heat. Furthermore, auxiliary cooling structure may be required to increase size and complexity. Therefore, a considerable need exists for an improved motion-control structure which is capable of dissipating developed heat more effectively than prior conventional structures.

In general, the present invention resides in the provision of an evaporation-condensation structure integrally within a motion-control structure. More specifically, a heat element of a motion-control structure (a force surface of which element receives heat) defines an internal cavity that is fitted with a capillary lining containing a working fluid or internal coolant, in such a manner that the working fluid establishes somewhat unconfined cyclic paths or flow patterns within the member to accomplish effective heat transfer by an evaporation-condensation cycle. Heat is thus effectively removed to a surface that is remote from the force surface and from which the heat can be conveniently dissipated.

BRIEF DESCRIPTION OF THE DRAWINGS

In the drawings, which constitute a part of this specification, an exemplary embodiment demonstrating various objectives and features hereof is set forth, specifically:

FIGURE 4 is a fragmentary sectional view of another apparatus constructed in accordance with the present invention;

FIGURE 5 is a fragmentary sectional view taken along line 5—5 of FIGURE 4; and

FIGURE 6 is a fragmentary sectional view of still another motion control apparatus constructed in accordance with the present invention.

DESCRIPTION OF THE ILLUSTRATIVE EMBODIMENT

As required, detailed embodiments of the invention are disclosed herein. However, it is to be understood that the embodiments are merely exemplary of the invention which may be embodied in many forms that are radically different from those illustrative embodiments presented herein. Therefore, specific structural and functional details disclosed herein are not to be interpreted as limiting, but merely as a basis for the claims actually defining the scope of this invention. In this regard, it is to be recognized that motion-control structures in accordance herewith, e.g. clutches and brakes, may be embodied in various forms, e.g. disks, drum and so on, and furthermore that such structures may be variously actuated, e.g. mechanically, pneumatically, hydraulically, magnetically, and so on. However, the disclosure hereof is presented only as a representative basis of teaching one skilled in the art to variously employ the present invention in virtually any appropriate detailed structure.

Figure 1:
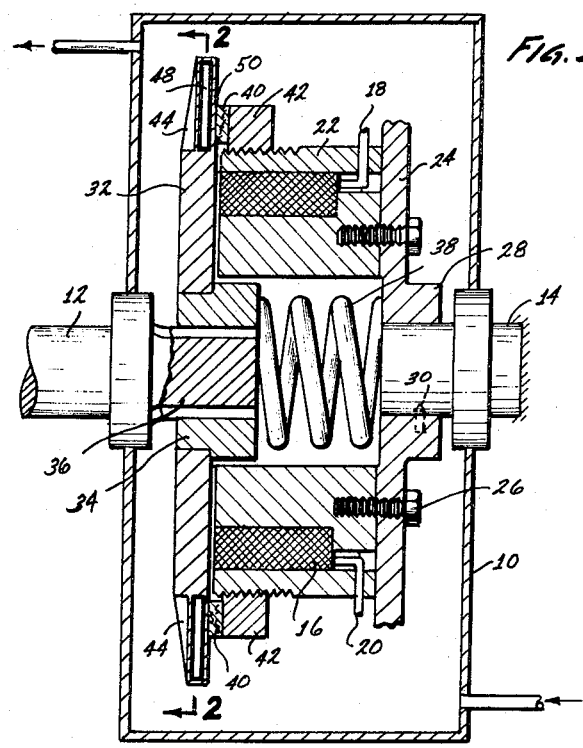
FIGURE 1 is a sectional view of a motion control apparatus constructed in accordance with the present invention.

Considering the structure of FIGURE 1 initially, there is shown a magnetically-operated disk brake constructed in accordance with the present invention. Specifically, the units is contained in a housing 10 and functions to control the relative motion that is coupled between a rotary shaft 12 and a stationary shaft 14. The unit is controlled by an electromagnet 16 which is coupled to a source of electrical energy (not shown) through an input conductor 18 and a return conductor 20. The electromagnet 16 is supported in an annular body 22 which is affixed to a circular carriage plate 24 by studs 26. The plate 24 defines a central hub 28 which concentrically receives the shaft 14, the two elements being interlocked by a key 30 (shown in phantom).

Just as the annular body 22 is coupled to the shaft 14, a disk 32 (left) is coupled to the shaft 12. Specifically, the disk 32 is affixed to include a central hub 34 which is internally mated with a splined termination 36 of the shaft 12. The hubs 28 and 32 are urged apart by a coil spring 38 fixed therebetween and lying within a central, axial opening in the body 22. When the spring is expanded, the disk 32 is moved from the body 22 with the result that the shafts 12 and 14 are in disengaged relationship. However, on energization of the electromagnet 16, the disk 32 becomes a magnetic armature and is drawn inwardly to engage an annulus 40 of friction material which is affixed on a flat annular surface of an internally-threaded ring 42 received on the body 22. Thus, when the electromagnet 16 is energized, the spring 38 is compressed (as shown) as the disk 32 is drawn toward the body 28 so that an exterior annular surface of the disk 32 engages the annulus 40. In this manner, the rotary shaft 12 is coupled to the stationary shaft 14 to the extent of frictional engagement between the disk 32 and the annulus 40.

Considering the structure of FIGURE 1 in somewhat greater detail, the disk 32 is integrally affixed with the hub 34 as by welding, and may be made of magnetic steel. An outside annular face at the exterior of the disk 32 defines a continuous series of somewhat radial fins 44 to increase the heat-transfer surface of the structure and to assist in the movement of fluid coolant within the housing 10. Within the disk 32 (substantially coincident with the annulus occupied by the fins 44) a series of segmental cavities 48 (FIGURE 2) are defined. Coincidentally, the segmental cavities 48 are directly within the disk 32 from the contact surface with the friction-material annulus 40. As a result, the segmental cavities 48 (FIGURE 1) occupy the space through which heat transfer is exceedingly important. That is the engagement between the surface 50 of the disk 32 and the friction-material annulus 40 results in the development of frictional heat which must be dissipated. The structure provided within the segmented cavities 48 in cooperation with the elements hereof accomplish an effective transfer of heat from the surface 50 to the fins 44 from which the heat is effectively dissipated, as to a coolant.

Figure 3:
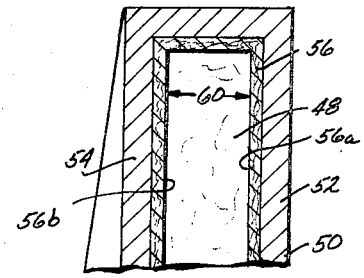
FIGURE 3 is a high-enlarged fragmentary view of the structure of FIGURE 1.
Figure 3:
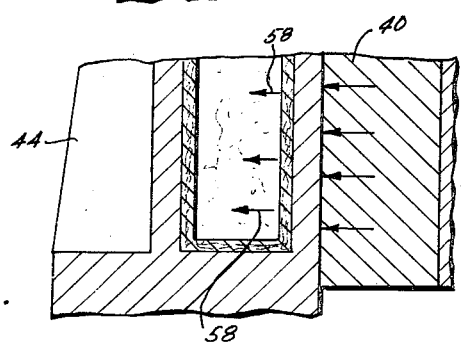

Considering the heat-flow path in greater detail, one of the cavities 48 is shown greatly enlarged in FIGURE 3, in which the force surface 50 is illustrated to be in frictional engagement with the annulus 40 so that heat is developed in substantial quantities at the surface 50. The transfer path of that heat is through the wall 52, then through the cavity 48 by an evaporation-condensation cycle to deposit the heat at the wall 54 for dissipation by the fins 44.

The interior of each of the cavities 48 is covered with a capillary lining 56 which may comprise any of a wide variety of different materials satisfactory for accomplishing capillary flow of the working fluid. The capillary lining 56 is impregnated with working fluid which may be effectively used in a closed evaporation cooling system. In general, the working of the fluid involves its evaporation in section 56a of the lining 56 (adjacent the wall 52) and passage (boiling off) through the space within the cavity 58 to condense at section 56b of the lining. Thus, the fluid is essentially "boiled off" from the lining section 56a to be condensed on the cooler lining section 56b.

The removal of working fluid from the lining section 56a leaves that material with a reduced amount of fluid with the result that capillary flow of the fluid in a liquid form is established from the section 56b back to the section 56a. As a result, a cycle is established as indicated by the dashed lines 58, in which the working fluid is evaporated at the wall 52 (carrying heat therefrom) and is condensed at the wall 54 (depositing heat for dissipation by the fins 44). Subsequently, the liquid working fluid establishes capillary flow through the lining 56 back to section 56a adjacent the hot wall 52.

As a result, a heat-flow cycle is established whereby the heat of friction is very effectively transferred from the force surface 50 to the fins 44 for dissipation. Although the operation of the system depends largely upon its specific design and the materials incorporated therein, preliminary investigation clearly reveals a substantial improvement over conventional solid heat conductors. In this regard, the structure hereof can be embodied employing a wide variety of different materials. Normally, the disk 32 will be formed entirely of metal, e.g. steel; however, certain other materials could be employed as well. The capillary lining 56 for the cavity 48 may comprise any of a variety of porous materials as fiber glass, heat-resistant cloth, porous metal, porous ceramic, a spongy or grooved surface lining, and so on, including any of a wide variety of materials capable of accommodating capillary flow. In a similar sense, the working fluid indicated by the line 58 may also comprise many different materials including water, acetone, ammonia, various salts, glycerine, sodium, lead, lithium, bismuth, or virtually any fluid having the desired evaporation-condensation characteristics for a particular application.

Figure 2:
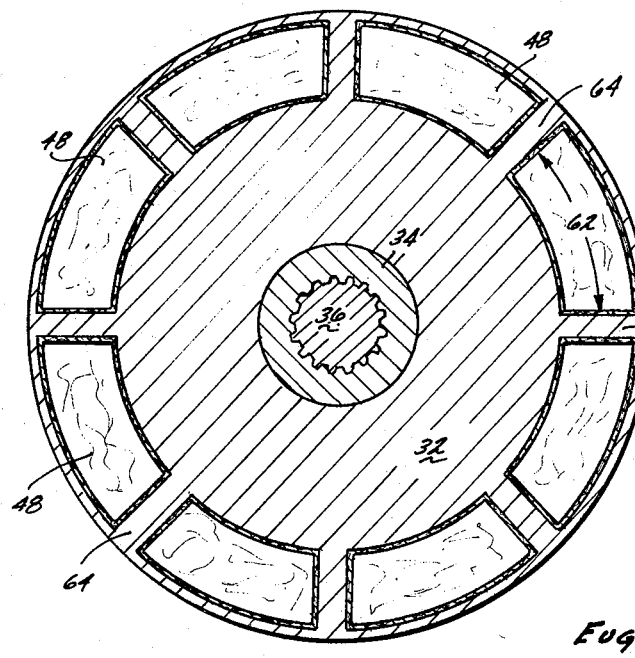
FIGURE 2 is a sectional view taken along line 2—2 of FIGURE 1.

In the system illustratively represented in FIGURES 1, 2 and 3, it is to be noted that the cavities 48 comprise a plurality of segmented or divided spaces of relatively limited thickness. In general, it has been found desirable to limit the width of the cavities 48. In many applications it has been found desirable to limit the linear measurement 60 to less than one inch.

Additionally, as indicated in FIGURE 2, it has also been found somewhat desirable to limit the circumferential angle 62 between segments 64. In that regard, indications are to the effect that if this angle is excessive, the system becomes severely limited. Generally, it has been found desirable to maintain the angle 62 less than 120 degrees in either a disk or a drum application. In this regard, the segments 64 dividing the cavities 48 perform an important function of reinforcing the wall 52 (FIGURE 3). Thus, it has been found important to provide a structure incorporating the solid segments 64 (FIGURE 2) to perform the dual function of limiting the size of the cavities 48 and additionally reinforcing the wall 52 which defines the force surface.

As suggested above, the system hereof may be readily embodied in a wide variety of different structures. The structure illustrated in FIGURES 1, 2 and 3 is somewhat representative of such structures; however, in the same sense, so is the structure illustrated in FIGURES 4 and 5 as will now be considered in detail.

The structure of FIGURE 4 exemplifies the application of the present invention to a drum brake (or clutch) which is pneumatically driven. The unit is symmetrical about a suport shaft 70 (one side only is shown) and controls the relative rotation between that shaft and a concentric sleeve 72 defining an external keyway 74. The coupling between the shaft 70 and the sleeve 72 is accomplished by a control structure 76 (generally indicated) incorporating a frictional engagement means. Specifically, the sleeve 72 includes an annular flange 78 which receives an affixed cylindrical collar 80, the external cylindrical surface 82 of which is indicated in frictional engagement with a ring 84 of friction material that is bonded to a stiffening plate 86 caried on a reinforced inflatable tube 88.

In general, the tube 88 is inflatably flexed by air received through an air-delivery duct 90, connected to receive inflating pressure. Thus, resilient distortion of the tube 88 engages the ring 84 of friction material against the surface 82. As a result, the sleeve 72 is frictionally coupled to a cylindrical hub 92, which is supported by an exterior flange plate 94, the center of which receives the shaft 70 and is rigidly affixed thereto on a fixed bushing 96. When the structure 76 is not engaged, the sleeve 72 may turn freely on bearings 98 and 99 (aligned on the shaft 70 by a spacer 100 and a collar 102). However, when the structure 76 is engaged, the sleeve 72 is locked against rotation in relation to the shaft 70.

It is to be noted that a lubricant plug 104 is provided in a bore through the sleeve 72, through which lubricant may be supplied to the bearings 98 and 99. Of course, the shaft 70 may be variously terminated just as the sleeve 72 may be variously connected to a hollow shaft or other structure by means of the keyway 74, depending upon particular applications and installations.

Considering the coupling structure in greater detail, the duct 90 includes pipes 106 and couplings 108 for connecting a concentric bore 110 in the shaft 70 to an elbow 112 which passes through a coupling 114 in the rim 92. The coupling is engaged to the double-walled inflatable tube 88 that encircles the collar 80, holding the ring 84 of friction material contiguous to the ring surface 82. Thus, when the tube 88 is inflated the ring 84 of friction material (which may be sectioned) is urged against the surface 82 to accomplish frictional engagement with the collar 80. As indicated, the colar is coupled to the sleeve 72, specifically by studs 106. As a result, when frictional engagement occurs between the ring 84 and the collar 80, the relative movement therebetween is frictionally coupled; however, as a result of that control considerable heat will be developed at the force surface 82.

The operation of the structure hereof to dissipate developed heat involves an evaporation-condensation cycle, somewhat as previously described. Specifically, the collar 80 (FIGURE 5) defines arcuate cavities 108 adjacent its peripheral surface 82. Each of the cavities 108 is lined with capillary material 110 as previously described, which material is filled with a working fluid. As a result, when the friction material of the ring 84 contacts the surface 82, resulting in the development of considerable quantities of heat, that heat is effectively transferred through the collar 80 as indicated by the arrows 112, passing from the surface through a wall 114, then passing by the evaporation-condensation cycle to the interior of a wall 116 to pass therethrough for dissipation on the inner surface of the collar.

It is to be noted that each of the cavities 108 is separated by a radial wall 120 which defines the heat-path thickness of the cavities and additionally, provides requisite reinforcement for the structure defining those cavities. As indicated, it has been found advantageous to restrict the size of the cavities and additionally important to reforce the member defining the cavities. In a drum application, the basis described in the disk application are conventionally translated.

From a consideration of the above, it is readily apparent that the present invention may be variously embodied with various clutches, brakes and the like employing Coulomb friction; however, the invention is also readily adaptable for incorporation into motion-control systems utilizing other forms of friction, e.g. viscous or fluid friction. The system of FIGURE 6 comprises a frictional system, e.g. a brake, utilizing a dispersion of magnetic particles in oil and is a symmetrical figure of revolution (half shown). Dispersions of magnetic fluid are known in the prior art and exhibit a considerably-variable viscosity, depending upon the magnetic field to which they are subjected. Specifically, if the oil-magnetic particle combination is subjected to an intense magnetic field, it becomes exceedingly viscose; however, if isolated from such a field, the viscosity becomes very low. As a result, by controlling the magnetic field, the viscosity of the fluid can be altered to accomplish controlled-viscosity friction for utilization in a clutch, brake or the like.

Considering the structure of FIGURE 6 in somewhat greater detail, the unit is carried on a central shaft 130 which is coupled to a varying extent to an axially-aligned shaft 132. The end of the shaft 132 (abutting the end of the shaft 130) includes an integral circular flange 134 which mates with an annular rim 136 and a circular plate 138 to define a somewhat cylindrical housing 140. The external rim 136 of the housing includes a circular external ridge 142 and is hollow as will be described in detail below.

The shaft 130 is actually received within the housing 140, to be locked into a sleeve 144 which is integral with a circular block 146 in which an annular coil 148 is contained. The coil 148 comprises an electromagnet and is energized through conductors carried by a conduit 150 and a bore 151 extending through the shaft 130 to slip rings or the like (not shown).

The circular block 146 as well as the housing 140 is formed of magnetic material so that when the coil 146 is energized, the space 152 defined between these elements experiences an intense magnetic field. In the system hereof, that space is filled with an oil-magnetic particle composition which is held in place by seals 154 and 156. The seals 154 and 156 accommodate slipping motion between the housing 140 and the block 146 which motion is facilitated by ball bearings 158 and 160 that are mounted between the sleeves 144 (integral with the block 146) and the housing 140.

In the operation of the structure of FIGURE 6, during uncoupled intervals, the circular block 146 may revolve freely with reference to the housing 140 because the composition in the space 152 has a low viscosity. As a result, relative rotary motion between the shaft 130 and 132 is permitted. However, on application of electrical energy to the coil 148, the composition in the space 152 is subjected to a magnetic field causing that material to become very viscose with the result that the shaft 130 and 132 become frictionally interconnected. Due to the structure of the coil 148, the magnetic field tends to be most intense adjacent the rim 136 so that the surface 162 becomes a force surface at which substantial heat is developed. Removal of that heat is accomplished by an evaporation-condensation cycle occurring in a chamber 164, defined in the rim 136, which chamber, as previously described, is lined with a capillary cover 164. As previously described, the cover 164 carries working fluid so that the heat developed at the surface 162 is effectively transferred to the exterior of the rim 136 and radiated therefrom. As a result, the effectiveness of the system is considerably increased and its capability to function as a clutch or a brake is significantly improved. It is to be noted that in the structure of FIGURE 6, the cavity 164 is formed in a shape to extend as a narrow passage in two dimensions. As a result, the radiating surface of the unit is significantly increased while the member is also somewhat reinforced.

From a consideration of the above, it is readily apparent that the system hereof may be variously embodied in a wide variety of different frictional motion-control structures in which developed heat is effectively dissipated. In addition to the advantages of effective heat dissipation, the system also affords light weight which is exceedingly important in many applications. Furthermore, the system hereof allows the use of structures which are relatively rigid (though hollow) thereby affording rather thin walls from which heat is effectively dissipated.

Of course, as indicated above, the system as disclosed is merely exemplary of some of the forms in which the invention may be embodied. Therefore, the scope hereof shall not be restricted to such illustrative embodiments but rather shall be interpreted in accordance with the claims set forth below.

What is claimed is:

1. A motion-control structure, comprising:
   structural means defining a force surface;
   means for forceful engagement with said structural means, whereby said force surface is heated substantially;
   closure means in combination with said surface means, defining a plurality of internal sealed cavities, contiguous to said surface, said closure means extending away from said surface;
   capillary means disposed contiguous the walls of said cavities; and
   a charge of working fluid in said cavities to establish an evaporation-condensation pattern to remove heat from said surface.

2. A motion-control structure according to claim 1, wherein said closure means includes a plurality of reinforcing walls to define said plurality of said cavities in separate spaced-apart relationship.

3. A motion-control structure according to claim 2, wherein said cavities have a thickness dimension substantially less than their other two dimensions.

4. A motion-control structure according to claim 2, wherein said closure means includes a heat-dissipation section, remote from said force surface.

5. A motion-control structure according to claim 4 further including an enlarged-surface structure defining fins on said heat-dissipation section.

6. A motion-control structure according to claim 2, wherein said capillary means comprises an open, metallic material defining porous channels to accommodate capillary flow therein.

7. A motion-control structure according to claim 2, wherein said structural means defining a force surface comprises a circular motion-control surface; wherein said means for forceful engagement comprises rotative means, movable with reference to said structural means, and includes means for establishing frictional forces between said rotative means and said structural means.

8. A motion-control means according to claim 7 wherein said structural means defines a disk.

9. A motion-control means according to claim 7 wherein said structural means defines a cylinder.

10. A motion-control means according to claim 7 wherein said cavities define an arcuate space of less than one-hundred-twenty degrees.

References Cited

UNITED STATES PATENTS

| | | | |
|---|---|---|---|
| 2,656,905 | 10/1953 | Langdon | 192—113 X |
| 2,837,180 | 6/1958 | Armstrong | 165—105 X |
| 2,986,238 | 5/1961 | Eaton | 192—113 X |
| 2,991,851 | 7/1961 | Alden | 192—113 X |
| 3,006,442 | 10/1961 | Wilkinson | 192—113 X |
| 3,028,935 | 4/1962 | Gold et al. | 192—113 X |
| 3,287,906 | 11/1966 | McCormick | 60—39.51 |

ROBERT A. O'LEARY, Primary Examiner

ALBERT W. DAVIS, Assistant Examiner

U.S. Cl. X.R.

165—86, 105; 188—264; 192—84